United States Patent
Kakuwa et al.

(10) Patent No.: US 10,305,132 B2
(45) Date of Patent: May 28, 2019

(54) HIGH-TEMPERATURE FUEL CELL SYSTEM

(71) Applicant: Panasonic Intellectual Property Management Co., Ltd., Osaka (JP)

(72) Inventors: Takashi Kakuwa, Osaka (JP); Shigenori Onuma, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 147 days.

(21) Appl. No.: 15/590,871

(22) Filed: May 9, 2017

(65) Prior Publication Data
US 2017/0338506 A1    Nov. 23, 2017

(30) Foreign Application Priority Data

May 19, 2016    (JP) ................................. 2016-100265

(51) Int. Cl.
*B01J 8/00*      (2006.01)
*B01J 8/02*      (2006.01)
(Continued)

(52) U.S. Cl.
CPC ........... *H01M 8/1231* (2016.02); *B01J 8/008* (2013.01); *B01J 8/0257* (2013.01); *B01J 8/0278* (2013.01);
(Continued)

(58) Field of Classification Search
CPC ............. H01M 8/1231; H01M 8/0618; H01M 8/1233; H01M 8/1246; H01M 8/0637;
(Continued)

(56) References Cited

U.S. PATENT DOCUMENTS

2013/0244126 A1    9/2013    Kobayashi

FOREIGN PATENT DOCUMENTS

| JP | 2014-022230 | 2/2014 |
| JP | 2014-078348 | 5/2014 |

(Continued)

OTHER PUBLICATIONS

The Extended European Search Report dated Oct. 13, 2017 for the related European Patent Application No. 17169524.0.

*Primary Examiner* — Gregg Cantelmo
(74) *Attorney, Agent, or Firm* — McDermott Will & Emery LLP

(57) ABSTRACT

A high-temperature fuel cell system includes a reformer that reforms a hydrocarbon-based raw fuel to generate a reformed gas containing hydrogen, a fuel cell that generates power by using the reformed gas and an oxidant gas, and a burner that heats the reformer. The burner includes an anode-off-gas gathering portion that has an anode-off-gas ejection hole and at which an anode off-gas discharged from an anode of the fuel cell gathers. The anode-off-gas gathering portion surrounds a first cathode-off-gas passing area through which a cathode off-gas discharged from a cathode of the fuel cell passes. The anode-off-gas ejection hole is formed such that the anode off-gas ejected upward from the anode-off-gas ejection hole approaches the cathode off-gas passing upward through the first cathode-off-gas passing area. The anode off-gas ejected from the anode-off-gas ejection hole and the cathode off-gas that has passed through the first cathode-off-gas passing area are burned.

9 Claims, 5 Drawing Sheets

(51) Int. Cl.

| | | |
|---|---|---|
| C01B 3/38 | (2006.01) | |
| F23D 14/22 | (2006.01) | |
| H01M 8/124 | (2016.01) | |
| H01M 8/0612 | (2016.01) | |
| H01M 8/0637 | (2016.01) | |
| H01M 8/1231 | (2016.01) | |
| H01M 8/1233 | (2016.01) | |
| H01M 8/1246 | (2016.01) | |
| H01M 8/2428 | (2016.01) | |
| H01M 8/04014 | (2016.01) | |

(52) U.S. Cl.
CPC .............. *B01J 8/0285* (2013.01); *C01B 3/38* (2013.01); *F23D 14/22* (2013.01); *H01M 8/04022* (2013.01); *H01M 8/0618* (2013.01); *H01M 8/1233* (2013.01); *H01M 8/1246* (2013.01); *H01M 8/2428* (2016.02); *B01J 2208/0053* (2013.01); *B01J 2208/00504* (2013.01); *H01M 8/0637* (2013.01); *H01M 2008/1293* (2013.01); *H01M 2250/10* (2013.01); *H01M 2300/0074* (2013.01); *Y02B 90/14* (2013.01); *Y02E 60/525* (2013.01); *Y02E 60/566* (2013.01); *Y02P 70/56* (2015.11)

(58) Field of Classification Search
CPC ....... H01M 8/2428; H01M 2008/1293; H01M 2250/10; H01M 2300/0074; F23D 14/20; B01J 8/008; B01J 8/0257; B01J 8/0278; B01J 8/0285; B01J 2208/00504; B01J 2208/0053; C01B 3/38; Y02P 70/56; Y02B 90/14; Y02E 60/525; Y02E 60/566
See application file for complete search history.

(56) References Cited

FOREIGN PATENT DOCUMENTS

| | | |
|---|---|---|
| JP | 2015-187952 | 10/2015 |
| WO | 2000/066487 A1 | 11/2000 |

HIGH-TEMPERATURE FUEL CELL SYSTEM

BACKGROUND

1. Technical Field

The present disclosure relates to a high-temperature fuel cell system.

2. Description of the Related Art

Japanese Unexamined Patent Application Publication No. 2015-187952 and Japanese Unexamined Patent Application Publication No. 2014-078348 each disclose a high-temperature fuel cell system in which a burner is disposed at the center of the system to keep a combustion space on the side on which a burner flame is ignited, and a reformer is disposed so as to surround the burner and the combustion space. In the high-temperature fuel cell system, the reformer is heated in a manner in which a flue gas from the burner passes along the outer circumference of the reformer. An air heat exchanger disposed on the outer circumference of the reformer heats air to be supplied to the cathode of a fuel cell.

Japanese Unexamined Patent Application Publication No. 2014-022230 discloses a high-temperature fuel cell system in which the upper portion of a fuel cell, which is an assembly of cylindrical cell tubes, forms a combustion space. In the high-temperature fuel cell system, an anode off-gas that has passed through the cylindrical cell tubes and a cathode off-gas that has passed outside the cylindrical cell tubes mix and are burned in the combustion space. The reformer and a water vaporizer are disposed above the combustion space. Accordingly, a flue gas from the combustion space heats the reformer and the water vaporizer, resulting in the occurrence of steam reforming reaction. An air heat exchanger is disposed so as to cover the outer shell of a container for a generator room. Air flowing through the air heat exchanger is supplied to the fuel cell from the lower side of the container for the generator room.

SUMMARY

However, for the conventional high-temperature fuel cell systems, sufficient consideration has not been given to, for example, reducing the size of the entire systems, reducing the production cost of the systems, and maintaining a good combustion state of the burner.

One non-limiting and exemplary embodiment provides a high-temperature fuel cell system that enables the footprint of the entire system and the production cost of the system to be less than those in conventional high-temperature fuel cell systems. One non-limiting and exemplary embodiment also provides a high-temperature fuel cell system that can maintain burner combustibility that is better than that in conventional high-temperature fuel cell systems.

In one general aspect, the techniques disclosed here feature a high-temperature fuel cell system including a reformer that reforms a hydrocarbon-based raw fuel to generate a reformed gas containing hydrogen, a fuel cell that generates power by using the reformed gas and an oxidant gas, and a burner that heats the reformer. The burner includes an anode-off-gas gathering portion that has an anode-off-gas ejection hole and at which an anode off-gas discharged from an anode of the fuel cell gathers. The anode-off-gas gathering portion is formed so as to surround a first cathode-off-gas passing area through which a cathode off-gas discharged from a cathode of the fuel cell passes. The anode-off-gas ejection hole is formed such that the anode off-gas ejected upward from the anode-off-gas ejection hole approaches the cathode off-gas passing upward through the first cathode-off-gas passing area. The anode off-gas ejected from the anode-off-gas ejection hole and the cathode off-gas that has passed through the first cathode-off-gas passing area are burned.

The high-temperature fuel cell system according to the aspect of the present disclosure enables the footprint of the entire system and the production cost of the system to be less than those in conventional high-temperature fuel cell systems. In addition, the high-temperature fuel cell system according to the aspect of the present disclosure can maintain burner combustibility that is better than that in conventional high-temperature fuel cell systems.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
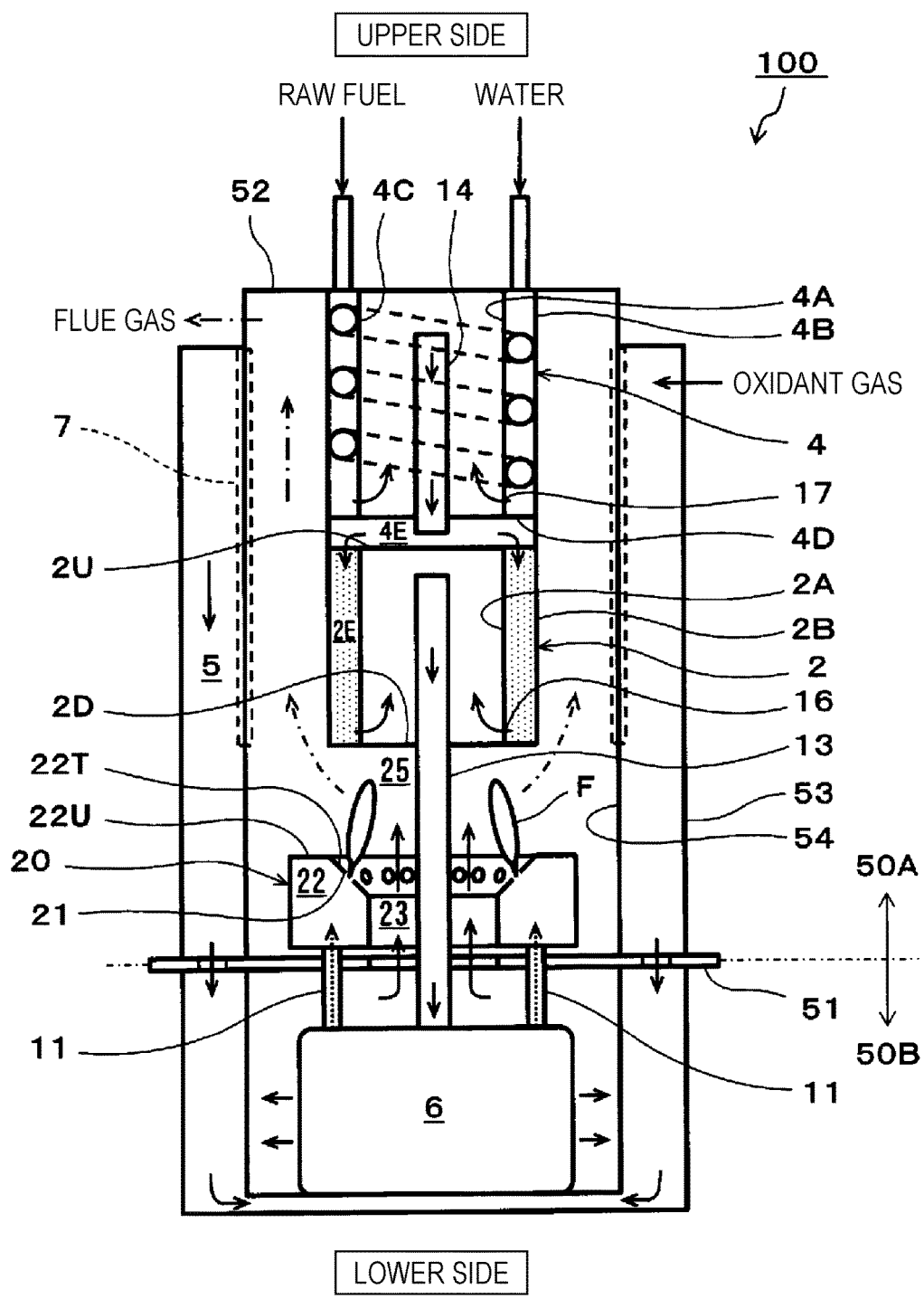
FIG. 1 illustrates a high-temperature fuel cell system according to an embodiment.

The present inventors have given careful consideration to reducing the size, reducing the production cost, and maintaining a good combustion state of a burner of a high-temperature fuel cell system (also referred to below as a fuel cell system) and have found the following.

In the case where the fuel cell system is installed at a proper location, there is a possibility that the projected area of the fuel cell system restricts a location at which the fuel cell system can be installed. For example, in the case where the fuel cell system is installed in a house, the fuel cell system is typically disposed along a wall of the house, and accordingly, the location of the fuel cell system in the depth direction is likely to be restricted. In this case, it is necessary for the fuel cell system to have a reduced thickness (size). In the case where the size of the fuel cell system is reduced, the size of high-volume components, such as a reformer, a burner, a heat exchanger, and a fuel cell (hot module), that are accommodated in the fuel cell system need to be reduced (specifically, a reduction in the depth of the system needs to be achieved).

In conventional high-temperature fuel cell systems, however, the size of the burner is not sufficiently reduced. For example, in the case where the container of the fuel cell system is formed of a cylindrical body, a reduction in the diameter of the cylindrical body, that is, a reduction in the footprint (reduction in the depth) is limited. The fuel cell system is formed of a cylindrical body due to a requirement for, for example, maintenance of an appropriate flame by the burner, suppression of an excessive temperature of a burner structure, and maintenance of a space for appropriately heating the reformer, particularly for the purpose of reducing production costs (reducing costs). There is also a limitation to sufficiently mixing an anode off-gas and a cathode off-gas without using a burner having a complex structure.

For example, in cylindrical fuel cell systems disclosed in Japanese Unexamined Patent Application Publication No. 2015-187952 and Japanese Unexamined Patent Application Publication No. 2014-078348, a reformer and an air heat exchanger are disposed outside a burner. The diameter of the entire systems amounts to the sum of the diameter of the burner and the width of the combustion space, the reformer, and the air heat exchanger. Accordingly, a reduction in the depth of the systems is limited, and it is thought that it is difficult to further reduce the size of the fuel cell systems.

In a rectangular fuel cell system disclosed in Japanese Unexamined Patent Application Publication No. 2014-022230, the length in the depth direction and the length in the width direction can be relatively freely determined to a certain extent, and accordingly, it is possible to reduce only the length in the depth direction. However, the length of welds on the container of the fuel cell system exceeds the length in a cylindrical fuel cell system, and a reduction in the production costs is limited. It is also thought that a rectangular fuel cell system is more susceptible than a cylindrical fuel cell system to a stress fracture and has disadvantages when long-term reliability is taken into account. In addition, the anode off-gas and the cathode off-gas flow parallel to each other in the combustion space, and accordingly, there is a possibility that the anode off-gas and the cathode off-gas do not sufficiently mix. For this reason, good burner combustibility cannot be maintained in some cases.

Thus, the present inventors have found that the arts disclosed in Japanese Unexamined Patent Application Publication No. 2015-187952, Japanese Unexamined Patent Application Publication No. 2014-078348, and Japanese Unexamined Patent Application Publication No. 2014-022230 have a room for improvement from the perspective of reducing the size and cost of the fuel cell systems as well as maintaining good burner combustibility. The present inventors have conceived an aspect of the present disclosure described below.

A high-temperature fuel cell system according to a first aspect of the present disclosure includes a reformer that reforms a hydrocarbon-based raw fuel to generate a reformed gas containing hydrogen, a fuel cell that generates power by using the reformed gas and an oxidant gas, and a burner that heats the reformer. The burner includes an anode-off-gas gathering portion that has an anode-off-gas ejection hole and at which an anode off-gas discharged from an anode of the fuel cell gathers. The anode-off-gas gathering portion is formed so as to surround a first cathode-off-gas passing area through which a cathode off-gas discharged from a cathode of the fuel cell passes. The anode-off-gas ejection hole is formed such that the anode off-gas ejected upward from the anode-off-gas ejection hole approaches the cathode off-gas passing upward through the first cathode-off-gas passing area. The anode off-gas ejected from the anode-off-gas ejection hole and the cathode off-gas that has passed through the first cathode-off-gas passing area are burned.

With this structure, the high-temperature fuel cell system according to the first aspect enables the footprint of the entire system and the production cost of the system to be less than those in conventional high-temperature fuel cell systems. In addition, the high-temperature fuel cell system according to the first aspect can maintain burner combustibility that is better than that in conventional high-temperature fuel cell systems.

Specifically, since the anode off-gas ejected upward from the anode-off-gas ejection hole approaches the cathode off-gas passing upward through the first cathode-off-gas passing area, a flame is ignited inward from the anode-off-gas ejection hole so as to approach the first cathode-off-gas passing area. Accordingly, the flame can be ignited in a small projected area, when viewed in plan view, unlike in the case where, for example, the flame is ignited outward so as to be away from the first cathode-off-gas passing area. This enables the footprint of the high-temperature fuel cell system to be less than that in conventional high-temperature fuel cell systems. In the case where the flame is ignited inward, the height of the flame can be lower than in the case where, for example, the flame is ignited vertically, and accordingly, the height of the high-temperature fuel cell system can be reduced.

Since the anode off-gas ejected upward from the anode-off-gas ejection hole approaches the cathode off-gas passing upward through the first cathode-off-gas passing area, a stream of the anode off-gas and a stream of the cathode off-gas can come into contact with each other. This improves the miscibility of the cathode off-gas and the anode off-gas in the combustion space. Consequently, burner combustibility that is better than that in conventional high-temperature fuel cell systems can be maintained.

Since the anode off-gas gathers at the anode-off-gas gathering portion, the dispersibility of the anode off-gas ejected from the anode-off-gas ejection hole can be improved more than in the case where no anode-off-gas gathering portion is provided. In other words, a variation in the concentration of hydrogen at the anode-off-gas gathering portion can be reduced even when the concentration of hydrogen in the anode off-gas ejected from each single cell of the fuel cell varies.

According to a second aspect of the present disclosure, in the high-temperature fuel cell system according to the first aspect, the anode-off-gas gathering portion is formed of an annular body having a hollow structure, and the first cathode-off-gas passing area is formed of a space in the annular body.

With this structure, the first cathode-off-gas passing area through which the cathode off-gas is supplied to the combustion space can be readily formed.

In addition, with this structure, the length and number of welds during production can be less than in the case where the anode-off-gas gathering portion is formed of, for example, a rectangular frame body, and the production cost of the anode-off-gas gathering portion is reduced. In addition, the width of the annular body can be reduced because of improved resistance to a gas pressure and improved resistance to a thermal stress. Thus, the cost of the high-temperature fuel cell system can be reduced.

According to a third aspect of the present disclosure, in the high-temperature fuel cell system according to the first aspect or the second aspect, the anode-off-gas gathering portion has a tapered surface sloping downward toward the first cathode-off-gas passing area, and the anode-off-gas ejection hole extends from the tapered surface.

With this structure, the formation of the anode-off-gas ejection hole, which is simple, extending from the tapered surface at an appropriate position enables the anode off-gas ejected upward from the anode-off-gas ejection hole to approach the cathode off-gas passing upward through the first cathode-off-gas passing area.

According to a fourth aspect of the present disclosure, the high-temperature fuel cell system according to any one of the first aspect, the second aspect, and the third aspect includes a reformed-gas supply path along which the reformed gas flows. The reformer is disposed above the burner. The reformed-gas supply path extends from the reformer to the fuel cell through the first cathode-off-gas passing area.

With this structure, the flame is ignited inward from the anode-off-gas ejection hole so as to approach the reformed-gas supply path. Accordingly, the heat dissipation of the reformed gas flowing along the reformed-gas supply path can be appropriately suppressed.

In the case where the flame ignited inward directly heats the reformed-gas supply path, there is a possibility that the temperature of the reformed-gas supply path becomes excessive. In the high-temperature fuel cell system according to the fourth aspect, however, the cathode off-gas passes through the first cathode-off-gas passing area formed around the reformed-gas supply path, and accordingly, the possibility can be reduced.

In the case where the reformed-gas supply path does not extend through the first cathode-off-gas passing area, the reformed-gas supply path needs to be detoured around the anode-off-gas gathering portion. In this case, there is a possibility that the footprint of the high-temperature fuel cell system increases. In the high-temperature fuel cell system according to the fourth aspect, however, the reformed-gas supply path extends through the first cathode-off-gas passing area, and accordingly, the possibility can be reduced.

An embodiment, a first modification to the embodiment, a second modification to the embodiment, and a third modification to the embodiment of the present disclosure will hereinafter be described with reference to the drawings.

The embodiment and the modifications described below are comprehensive or specific examples according to an aspect of the present disclosure. In the following description, numerical values, shapes, materials, components, and the position and connection form of the components are described by way of example and do not limit the present disclosure. Among the components described below, components that are not recited in the independent claim showing the most generic concept of the present disclosure are described as arbitrary components. In the drawings, description of components designated by like symbols is omitted in some cases. In the drawings, each component is schematically illustrated for simplicity, and the shape and dimension thereof are not accurate in some cases.

Embodiment
Structure of System

FIG. 1 illustrates a high-temperature fuel cell system according to the embodiment.

In the following description, a solid oxide fuel cell system (referred to below as a SOFC system 100) including a solid oxide fuel cell (referred to below as a SOFC 6) serving as a power generator is taken as a specific example of the high-temperature fuel cell system, but the high-temperature fuel cell system is not limited to such. The structure of the high-temperature fuel cell system is not limited provided that the high-temperature fuel cell system is a fuel cell system that operates at a high temperature (for example, 600° C. or more). For example, instead of the SOFC system 100 described below, the high-temperature fuel cell system may be a molten carbonate fuel cell system including a molten carbonate fuel cell (MCFC) serving as a power generator.

For convenience, a "upper side" and a "lower side" are illustrated in FIG. 1 (and other figures), and the gravity acts from the upper side to the lower side.

According to the embodiment illustrated in FIG. 1, the SOFC system 100 includes a reformer 2, a vaporizer 4, an oxidant-gas supply path 5, the SOFC 6, an oxidant-gas heat exchanger 7, anode off-gas discharge paths 11, a reformed-gas supply path 13, a mixed-gas supply path 14, a burner 20, and a first cathode-off-gas passing area 23.

In the SOFC system 100 according to the embodiment, a partition wall 51 is disposed so as to partition the inside of the SOFC system 100 into an upper area 50A in which, for example, the reformer 2, the vaporizer 4, and the burner 20 are accommodated and a lower area 50B in which, for example, the SOFC 6 is accommodated.

The reformer 2 reforms a hydrocarbon-based raw fuel to generate a reformed gas containing hydrogen. According to the embodiment, the reformer 2 is disposed above the burner 20 and includes a side wall portion formed of an inner wall 2A and an outer wall 2B. The reformer 2 does not necessarily include the side wall portion defining a space in the reformer 2.

In the case where the reformer 2 includes the side wall portion with an appropriate thickness, heat is likely to be transferred from a flue gas to the whole of a reforming catalyst 2E on the side wall portion of the reformer 2.

Specifically, in the case where the reforming catalyst 2E is disposed on the side wall portion of the reformer 2, the SOFC system 100 enables heat to be sufficiently transferred from the flue gas to the entire reforming catalyst 2E while maintaining an appropriate amount of the reforming catalyst 2E. In the SOFC system 100 according to the embodiment, a distance between the inner wall 2A and the outer wall 2B (that is, the thickness of the side wall portion) is determined to be about 10 mm so that heat is sufficiently transferred from the flue gas to the entire reforming catalyst 2E while maintaining, for example, the necessary amount (for example, about 200 g) of the reforming catalyst in the reformer 2. Such a specific structure of the reformer 2 is described by way of example, which does not limit the reformer 2.

In the SOFC system 100 according to the embodiment, the inner wall 2A and outer wall 2B of the reformer 2 are cylindrical bodies but are not limited thereto. The inner wall 2A and the outer wall 2B may be, for example, rectangular tubes.

However, in the case where the inner wall 2A and outer wall 2B of the reformer 2 are cylindrical bodies as in the SOFC system 100 according to the embodiment, the length and number of welds during production can be less than in the case where the inner wall 2A and the outer wall 2B are rectangular tubes, and the production cost of the reformer 2 is reduced. In addition, the width of the cylindrical bodies can be reduced because of improved resistance to a gas pressure and improved resistance to a thermal stress. Thus, the cost of the SOFC system 100 can be reduced.

In the SOFC system 100 according to the embodiment, an upper end area of the side wall portion of the reformer 2 is covered by an upper plate member 2U, and a lower end area of the side wall portion is covered by a lower plate member 2D. Openings (not illustrated) through which a gas to be supplied to the reforming catalyst 2E passes are formed in a circumferential portion of the upper plate member 2U.

As illustrated in FIG. 1, a high-temperature flue gas passes through a space between the outer wall 2B of the reformer 2 and the inner wall 54 of the container of the SOFC system 100. Thus, the reforming catalyst 2E of the reformer 2 is heated by the heat of the flue gas. Details of the burner 20 that generates such a flue gas will be described later.

A turn portion 16 is disposed near the lower end portion of the inner wall 2A of the reformer 2. The turn portion 16 has openings (not illustrated) that are arranged along the circumference of the inner wall 2A. The openings are formed in the inner wall 2A so as to have a size (for example, circular holes each having a diameter of about 1 to 3 mm) that prevents catalyst particles of the reforming catalyst from passing therethrough and enables the reformed gas to pass therethrough.

The reformed-gas supply path 13 extends through the lower plate member 2D in an airtight state and extends vertically upward through the space in the reformer 2. The upper end portion of the reformed-gas supply path 13 is located below the upper plate member 2U so as not to impede the reformed gas flowing from the space in the reformer 2 to the reformed-gas supply path 13. The lower end portion of the reformed-gas supply path 13 is connected to the SOFC 6.

Reforming reaction in the reformer 2 may be any type of reforming reaction. Examples of the reforming reaction include steam reforming reaction, autothermal reaction, and partial oxidation reaction. At least one selected from the group consisting of a noble-metal-based catalyst such as Pt, Ru, and Rh and Ni may be typically used as the catalyst metal of the reforming catalyst. Components that are needed for the reforming reaction are appropriately provided although these are not illustrated in FIG. 1. For example, in the case where the reforming reaction is steam reforming reaction, the vaporizer 4 includes a water supplier (for example, a pump) that supplies water. In the case where the reforming reaction is autothermal reaction, the SOFC system 100 includes an air supplier (for example, a blower) that supplies air to the reformer 2.

A raw fuel to be supplied to the reformer 2 may be a hydrocarbon-based fuel gas containing an organic compound including at least carbon and hydrogen such as town gas including methane as a primary component, natural gas, or liquefied petroleum gas (LPG) or may be a hydrocarbon-based liquid fuel such as an alcohol, a biofuel, or a light oil.

In the SOFC system 100 according to the embodiment, the reforming reaction in the reformer 2 is steam reforming reaction. Accordingly, the vaporizer 4 is disposed right above the upper plate member 2U of the reformer 2.

The vaporizer 4 includes a side wall portion formed of an inner wall 4A and an outer wall 4B and a bottom portion 4E formed of the upper plate member 2U and the lower plate member 4D of the reformer 2. The upper end area of the side wall portion of the vaporizer 4 is covered by the upper wall 52 of the container of the SOFC system 100, and the lower end area of the side wall portion is covered by the lower plate member 4D. Accordingly, a space is formed inside the side wall portion of the vaporizer 4, and a space is formed inside the bottom portion 4E. A passage member 4C (for example, a wire) is wound in the side wall portion so as to form a spiral path.

The outer wall 4B of the vaporizer 4 and the outer wall 2B of the reformer 2 are formed of the same cylindrical body. This reduces the number of the components of the SOFC system 100.

In the SOFC system 100 according to the embodiment, the inner wall 4A and outer wall 4B of the vaporizer 4 are cylindrical bodies but are not limited thereto. The inner wall 4A and the outer wall 4B may be, for example, rectangular tubes.

However, in the case where the inner wall 4A and outer wall 4B of the vaporizer 4 are cylindrical bodies as in the SOFC system 100 according to the embodiment, the length and number of welds during production can be less than in the case where the inner wall 4A and the outer wall 4B are rectangular tubes, and the production cost of the vaporizer 4 is reduced. In addition, the width of the cylindrical bodies can be reduced because of improved resistance to a gas pressure and improved resistance to a thermal stress. Thus, the cost of the SOFC system 100 can be reduced.

As illustrated in FIG. 1, the high-temperature flue gas passes through a space between the outer wall 4B of the vaporizer 4 and the inner wall 54 of the container of the SOFC system 100. Thus, the inside of the side wall portion of the vaporizer 4 is heated by the heat of the flue gas.

A turn portion 17 is disposed near the lower end portion of the inner wall 4A of the vaporizer 4. The turn portion 17 has openings (not illustrated) that are arranged along the circumference of the inner wall 4A. The mixed-gas supply path 14 along which a mixed gas of the raw fuel and steam flows extends through the lower plate member 4D in an airtight state and extends vertically upward in the space in the vaporizer 4. The upper end portion of the mixed-gas supply path 14 is located below the upper wall 52 so as not to impede the mixed gas flowing from the space in the vaporizer 4 to the mixed-gas supply path 14. The lower end portion of the mixed-gas supply path 14 is located above the upper plate member 2U so as not to impede the mixed gas flowing from the space inside the bottom portion 4E of the vaporizer 4 to the reforming catalyst 2E.

The structure of the vaporizer 4 is not limited provided that the vaporizer 4 is arranged so as to be in contact with the reformer 2. For example, the vaporizer 4 and the reformer 2 are arranged in this order in the direction from the upper side to the lower side as in the SOFC system 100 according to the embodiment, and the side wall portion of the vaporizer 4 may be connected to the side wall portion of the reformer 2 with the bottom portion 4E of the vaporizer 4 interposed therebetween. The side wall portion of the vaporizer may be connected to the side wall portion of the reformer in a manner in which the vaporizer and the reformer are joined to each other by using a vertically extending member, not illustrated, with a desired space interposed therebetween in the vertical direction.

The structure of the SOFC system 100 is simplified in a manner in which the vaporizer 4 is arranged so as to be in contact with the reformer 2. That is, in the case where the vaporizer 4 and the reformer 2 are arranged integrally with each other so as to be aligned in the vertical direction, the SOFC system 100 can be simpler than in the case where, for example, the vaporizer and the reformer are arranged separately from each other.

The SOFC 6 generates power by using the reformed gas and an oxidant gas. The oxidant gas flows along the oxidant-gas supply path 5 and is supplied to the cathode of the SOFC 6. The reformed gas flows along the reformed-gas supply path 13 and is supplied to the anode of the SOFC 6. In the SOFC 6, multiple single cells (not illustrated) of the SOFC 6 are aggregated and connected to each other in series. The SOFC 6 may be formed of stacked flat plate-shaped single cells or aggregated cylindrical single cells. The SOFC 6 according to the embodiment is formed of a flat plate-shaped stack of the flat plate-shaped single cells and other components, an example of which is an interconnector. The SOFC system 100 includes a temperature sensor (not illustrated) that detects the operating temperature (for example, 600° C. or more) of the SOFC 6 and an electrode (not illustrated) through which a generated electric current flows from the SOFC 6 to the outside. The structure of the SOFC 6 is the same as a typical SOFC, and description of the detailed structure thereof is omitted.

The oxidant-gas supply path 5 is a path along which the oxidant gas to be supplied to the cathode of the SOFC 6 flows. Specifically, the oxidant gas is supplied by an oxidant-gas supplier (for example, a blower), not illustrated, to the oxidant-gas supply path 5 and is subsequently supplied to the SOFC 6. Examples of the oxidant gas include air.

The oxidant-gas supply path 5 is formed between the inner wall 54 and outer wall 53 of the container of the SOFC system 100. The inner wall 54 extends from the upper wall 52 of the container of the SOFC system 100 to the lower side of the SOFC 6 and covers the bottom portion of the SOFC 6. Since the operating temperature of the SOFC system 100 becomes a high temperature (for example, 600° C. or more), the container of the SOFC system 100 is typically covered by an insulating material, not illustrate, to suppress heat dissipation to the outside.

Each of the anode off-gas discharge paths 11 is a path along which an anode off-gas discharged from the anode of the SOFC 6 flows. Specifically, a reformed gas (anode off-gas) that is not used for power generation in the SOFC 6 flows to the anode off-gas discharge paths 11, passes along the anode off-gas discharge paths 11, and is subsequently supplied to the burner 20. In the SOFC system 100 according to the embodiment, the anode off-gas discharge paths 11 each extend from the anode of the SOFC 6 to an anode-off-gas gathering portion 22 (described in detail later) of the burner 20 through the lower area 50B and the partition wall 51. In the embodiment, the number of the anode off-gas discharge paths 11 is two but is not limited thereto.

A cathode-off-gas discharge path is a path along which the cathode off-gas discharged from the cathode of the SOFC 6 flows. Specifically, an oxidant gas (cathode off-gas) that is not used for power generation in the SOFC 6 passes along the cathode-off-gas discharge path and is subsequently supplied to a combustion space 25. In the SOFC system 100 according to the embodiment, the cathode-off-gas discharge path is formed of a space between the outer shell of the SOFC 6 and the inner wall 54, a space between the outer shell of the SOFC 6 and the partition wall 51, and the first cathode-off-gas passing area 23 (described in detail later). The reformed-gas supply path 13 extends from the reformer 2 to the SOFC 6 through the first cathode-off-gas passing area 23.

The oxidant-gas heat exchanger 7 enables heat exchange between the oxidant gas flowing along the oxidant-gas supply path 5 and the flue gas flowing inside the inner wall 54. Specifically, at the oxidant-gas heat exchanger 7, part of the inner wall 54 that is exposed to the flue gas functions as a heat-transfer surface. Thus, when the oxidant gas (air) having a normal temperature flows downward along the oxidant-gas supply path 5, heat is exchanged between the oxidant gas and the flue gas flowing upward inside the inner wall 54, and the oxidant gas is heated to a high temperature (for example, about 600° C. to 700° C.). The oxidant gas is heated to a temperature that is necessary for power-generation reaction in the SOFC 6 by using heat generated by internal reforming reaction in the SOFC 6 and is supplied to the cathode of the SOFC 6 from a lower portion of the container in which the SOFC 6 is accommodated. The flue gas is cooled to an appropriate temperature (for example, about 100° C. to 200° C.), subsequently discharged to the outside of the SOFC system 100, and supplied to, for example a heat exchanger, not illustrated, that produces hot water for hot-water supply.

The burner 20 heats the reformer 2. The burner 20 includes the anode-off-gas gathering portion 22 having anode-off-gas ejection holes 21 (for example, circular holes), and the anode off-gas discharged from the anode of the SOFC 6 gathers at the anode-off-gas gathering portion 22. The anode-off-gas gathering portion 22 is formed so as to surround the first cathode-off-gas passing area 23 through which the cathode off-gas discharged from the cathode of the SOFC 6 passes. In the SOFC system 100 according to the embodiment, the anode-off-gas gathering portion 22 is formed of an annular body having a hollow structure. The partition wall 51 facing a space in the annular body has openings. The space in the annular body and the openings form the first cathode-off-gas passing area 23.

Thus, the first cathode-off-gas passing area 23 through which the cathode off-gas is supplied to the combustion space 25 can be readily formed.

Each of the anode-off-gas ejection holes 21 is formed such that the anode off-gas ejected upward from the anode-off-gas ejection holes 21 approaches the cathode off-gas passing upward through the first cathode-off-gas passing area 23. Specifically, the anode-off-gas gathering portion 22 has a tapered surface 22T sloping downward toward the first cathode-off-gas passing area 23, and the anode-off-gas ejection holes 21 extend from the tapered surface 22T.

The anode off-gas ejected from the anode-off-gas ejection holes 21 and the cathode off-gas that has passed through the first cathode-off-gas passing area 23 are thus burned.

In the SOFC system 100 according to the embodiment, the anode-off-gas gathering portion 22 is formed of an annular body but is not limited thereto. The anode-off-gas gathering portion 22 may be formed of, for example, a rectangular frame body.

However, in the case where the anode-off-gas gathering portion 22 is formed of an annular body as in the SOFC system 100 according to the embodiment, the length and number of welds during production can be less than in the case where the anode-off-gas gathering portion 22 is formed of, for example, a rectangular frame body, and the production cost of the anode-off-gas gathering portion 22 is reduced. In addition, the width of the annular body can be reduced because of improved resistance to a gas pressure and improved resistance to a thermal stress. Thus, the cost of the SOFC system 100 can be reduced.

The structure of the burner 20 will now be described in more detail with reference to the drawings.

As illustrated in FIG. 1, the anode-off-gas gathering portion 22 is hollowed so as to be tapered from an upper surface 22U toward the first cathode-off-gas passing area 23, and an opening area at the center of the hollow, through which the reformed-gas supply path 13 extends, forms the first cathode-off-gas passing area 23. That is, the hollow is annular in plan view. The combustion space 25, in which the anode off-gas and the cathode off-gas are burned, is formed right above the hollow. The sloped surface of the hollow is the tapered surface 22T. The anode-off-gas ejection holes 21 extend at predetermined positions from the tapered surface 22T. The formation of the anode-off-gas ejection holes 21, which are simple, at appropriate positions of the tapered surface 22T enables the anode off-gas ejected upward from the anode-off-gas ejection holes 21 to approach the cathode off-gas passing upward through the first cathode-off-gas passing area 23 toward the combustion space 25.

The structure of the anode-off-gas ejection holes 21 is not limited provided that the anode-off-gas ejection holes 21 are openings extending at predetermined positions from the tapered surface 22T. For example, about 5 to 40 anode-offgas ejection holes 21 (for example, circular holes each having a diameter of about 2 mm) may be formed at equal intervals in the circumferential direction at the center of the tapered surface 22T in the width direction, and the tapered surface 22T may form an angle of about 45 degrees with the upper surface 22U. In this case, the anode off-gas is distributed uniformly to the anode-off-gas ejection holes 21 and ejected from the anode-off-gas gathering portion 22 diagonally upward. Such a specific structure of the anode-off-gas ejection holes 21 is described by way of example, which does not limit the anode-off-gas ejection holes 21.

Thus, flames F are ignited inward from the anode-off-gas ejection holes 21 so as to approach the reformed-gas supply path 13 (first cathode-off-gas passing area 23). Assuming an imaginary cylindrical body including the anode-off-gas ejection holes 21 formed around the central axis of a pipe (straight pipe) forming the reformed-gas supply path 13, the flames F are ignited inside the imaginary cylindrical body.

The flames F heat the lower plate member 2D of the reformer 2, and accordingly, the temperature of a gas outlet at the reforming catalyst 2E is easy to control so as to be the highest temperature (for example, about 600° C. to 700° C.). The conversion ratio of the reforming reaction of the reforming catalyst 2E depends on temperature. The reforming reaction, which is endothermic reaction, effectively progresses in a manner in which the temperature of the gas outlet at the reforming catalyst 2E is controlled to be the highest temperature, and this manner is preferable to improve the reforming efficiency of the reforming catalyst 2E.

Operation

An example of the operation of the SOFC system 100 according to the embodiment will now be described with reference to FIG. 1.

First, water from the water supplier, not illustrated, and a raw fuel from a raw fuel supplier, not illustrated, are supplied to the side wall portion of the vaporizer 4. The raw fuel and the water flow along the spiral path formed of the passage member 4C in the side wall portion of the vaporizer 4 so as to spirally descend. At this time, the outer surface of the side wall portion of the vaporizer 4 is exposed to the flue gas having a temperature (for example, about 100° C. to 300° C.) higher than the boiling point of water. Accordingly, the water is vaporized by being heated by the heat of the flue gas, and the steam and the raw fuel appropriately mix.

The mixed gas passes through the turn portion 17 disposed on the inner wall 4A of the vaporizer 4 and subsequently flows upward through the space in the vaporizer 4. The mixed gas subsequently gathers so as to turn again at the upper end portion of the mixed-gas supply path 14 and flows along the mixed-gas supply path 14 from the upper end portion in the direction (downward) toward the bottom portion 4E of the vaporizer 4.

The structure by which the mixed gas turns improves the miscibility of the steam and the raw fuel. While the mixed gas having a high temperature ascends after turning at the turn portion 17, the inside of the vaporizer 4 is heated by the heat of the mixed gas. This structure, together with the structure by which the outer surface of the vaporizer 4 is heated by the heat of the flue gas, appropriately inhibits the vaporizer 4 from being unevenly heated.

The mixed gas in the bottom portion 4E of the vaporizer 4 is supplied from the openings (not illustrated) formed in the circumferential portion of the upper plate member 2U of the reformer 2 to the reforming catalyst 2E in the side wall portion of the reformer 2. The steam reforming of the raw fuel can be thus performed by the reformer 2.

At this time, the gas in the reformer 2 (side wall portion in the embodiment) that is contact with the outer wall 2B of the reformer 2 flows in the direction opposite to the direction in which the flue gas flows while being contact with the outer wall 2B of the reformer 2. At this time, the gas in the reformer 2 is heated by the heat of the flue gas. The temperature of the reforming catalyst 2E increases to a temperature proper for the reforming reaction. The raw fuel is then reformed by the reforming catalyst 2E, thereby producing a reformed gas containing hydrogen. In particular, according to the embodiment, the gas in the reformer 2 flows in the direction opposite to the direction in which the flue gas flows, and accordingly, the efficiency of heat exchange between these gasses is improved unlike in the case of a parallel-flow heat exchanger and the case of a serial-flow heat exchanger.

In the SOFC 6, the single cells themselves perform internal reforming reaction. Accordingly, it is not necessary for the reformer 2 to completely finish the reforming reaction. In general, a conversion ratio of about 50 to 90% suffices for the reformer 2.

The reformed gas passes through the turn portion 16 disposed on the inner wall 2A of the reformer 2 and subsequently flows upward through the space in the reformer 2. The reformed gas subsequently gathers again so as to turn at the upper end portion of the reformed-gas supply path 13 and flows along the reformed-gas supply path 13 from the upper end portion in the direction (downward) toward the burner 20. While the reformed gas having a high temperature (for example, about 600° C. to 700° C.) ascends after turning at the turn portion 16, the reforming catalyst 2E is heated from the inside by the heat of the reformed gas. This structure, together with the structure by which the reforming catalyst 2E is heated from the outside by the heat of the flue gas, appropriately inhibits the reforming catalyst 2E from being unevenly heated.

The reformed gas is supplied to the anode of the SOFC 6 through the reformed-gas supply path 13, and the oxidant gas is supplied to the cathode of the SOFC 6 through the oxidant-gas supply path 5. The SOFC 6 generates power by using the reformed gas and the oxidant gas. Specifically, hydrogen in the reformed gas and oxygen in the oxidant gas cause power generation reaction in the SOFC 6, and an electric current flows from the SOFC 6. At this time, the reformed gas on the reformed-gas supply path 13 that is to be supplied to the anode of the SOFC 6 is heated by the flames F of the burner 20. The oxidant gas to be supplied to the cathode of the SOFC 6 is heated by the heat of the flue gas at the oxidant-gas heat exchanger 7.

An anode off-gas (reformed gas) and a cathode off-gas (oxidant gas) that are not conducive to the power generation reaction in the SOFC 6 are burned by the burner 20. Specifically, as illustrated in FIG. 1, the anode off-gas ejected from the anode-off-gas ejection holes 21 of the anode-off-gas gathering portion 22 of the burner 20 is mixed with the cathode off-gas passing through the first cathode-off-gas passing area 23, and the mixed gas is burned. At this time, as illustrated in FIG. 1, the flames F are ignited inward from the anode-off-gas ejection holes 21 so as to approach the reformed-gas supply path 13.

The flue gas produced when the mixed gas is burned passes upward through the space between the outer wall 2B of the reformer 2 and the inner wall 54 of the container of the SOFC system 100 and the space between the outer wall 4B of the vaporizer 4 and the inner wall 54 of the container of the SOFC system 100 in this order. The flue gas is subsequently discharged from a flue-gas outlet (not illustrated) formed near the upper end of the container of the SOFC system 100 to the outside. An appropriate temperature of the vaporization of water is lower than an appropriate temperature of the reforming reaction. In the case where the flue gas flows in the above order, the heat of the flue gas produced by the burner 20 can be effectively used.

The SOFC system 100 according to the embodiment enables the footprint of the entire system and the production cost of the system to be less than those in conventional high-temperature fuel cell systems. In addition, the SOFC system 100 according to the embodiment can maintain the combustibility of the burner 20 that is better than that in conventional high-temperature fuel cell systems.

Specifically, since the anode off-gas ejected upward from the anode-off-gas ejection holes 21 approaches the cathode off-gas passing upward through the first cathode-off-gas passing area 23, the flames F are ignited inward from the anode-off-gas ejection holes 21 so as to approach the reformed-gas supply path 13 (first cathode-off-gas passing area 23). Accordingly, the flames F can be ignited in a small projected area, when viewed in plan view, unlike in the case where, for example, the flames F are ignited outward so as to be away from the reformed-gas supply path 13 (first cathode-off-gas passing area 23). This enables the footprint of the SOFC system 100 to be less than that in conventional high-temperature fuel cell systems. In the case where the flames F are ignited inward, the height of the flames F can be lower than in the case where, for example, the flames F are ignited vertically, and accordingly, the height of the SOFC system 100 can be reduced.

Since the anode off-gas ejected upward from the anode-off-gas ejection holes 21 approaches the cathode off-gas passing upward through the first cathode-off-gas passing area 23, a stream of the anode off-gas and a stream of the cathode off-gas can come into contact with each other. This improves the miscibility of the cathode off-gas and the anode off-gas in the combustion space 25. Consequently, the combustibility of the burner 20 that is better than that in conventional high-temperature fuel cell systems can be maintained.

Since the anode off-gas gathers at the anode-off-gas gathering portion 22, the dispersibility of the anode off-gas ejected from the anode-off-gas ejection holes 21 can be improved more than in the case where no anode-off-gas gathering portion is provided. In other words, a variation in the concentration of hydrogen at the anode-off-gas gathering portion 22 can be reduced even when the concentration of hydrogen in the anode off-gas ejected from each single cell of the SOFC 6 varies.

The constituent (volume ratio) of the anode off-gas depends particularly on the fuel utilization (Uf) of the SOFC system 100. In the case where the system operates with a Uf of about 75% to generate a power of about 800 W by using a direct current, the ratio of water is about 65%, which is largest, the ratio of carbon dioxide and the ratio of hydrogen are about 15% each, and the ratio of carbon monoxide is about 4%. Thus, the concentration of hydrogen in the mixed gas of the cathode off-gas and the anode off-gas is only about 4%, which does not leave enough of a margin with respect to a lower limit of about 3% of the range in which hydrogen can be burned, as is described in typical literature cited. As disclosed in, for example, Japanese Unexamined Patent Application Publication No. 2014-022230, in the case where each anode off-gas ejected from several hundreds of single cells are burned, there is a possibility that a flame is extinguished when a variation in the concentration of hydrogen in the anode off-gas ejected from the single cells occurs due to a variation in power generation of each single cell or uneven flows. In contrast, the SOFC system 100 according to the embodiment can reduce the possibility because the variation in the concentration of hydrogen can be reduced at the anode-off-gas gathering portion 22.

Since the flames F are ignited inward from the anode-off-gas ejection holes 21 so as to approach the reformed-gas supply path 13, the heat dissipation of the reformed gas flowing along the reformed-gas supply path 13 can be appropriately suppressed. In addition, the tip of the flames F ignited inward faces the lower plate member 2D of the reformer 2, and accordingly, the gas outlet at the reforming catalyst 2E, which needs the highest amount of heat, can be heated.

For example, the temperature of the entire combustion space 25 including the flames F can be a high temperature of, for example, about 700 to 800° C. when the SOFC system 100 starts to operate. Accordingly, the vicinity of outlets for the oxidant gas in the upper area 50A can be heated to about 680° C., and the SOFC 6 and the container thereof can be heated for a short period of time. Also, when the SOFC system 100 generates power, the temperature of the gas outlet at the reforming catalyst 2E and the temperature of the oxidant gas before the oxidant gas is supplied to the SOFC 6 can be kept, for example, about 630° C. and about 650° C., respectively.

In the case where the flames F ignited inward directly heats the reformed-gas supply path 13, there is a possibility that the temperature of the reformed-gas supply path 13 becomes excessive. In the SOFC system 100 according to the embodiment, however, the cathode off-gas passes through the first cathode-off-gas passing area 23 formed around the reformed-gas supply path 13, and accordingly, the possibility can be reduced.

In the case where the reformed-gas supply path 13 does not extend through the first cathode-off-gas passing area 23, the reformed-gas supply path 13 needs to be detoured around the anode-off-gas gathering portion 22. In this case, there is a possibility that the footprint of the SOFC system 100 increases. In the SOFC system 100 according to the embodiment, however, the reformed-gas supply path 13 extends through the first cathode-off-gas passing area 23, and accordingly, the possibility can be reduced.

A specific concentration and temperature in the SOFC system 100 are described by way of example, which does not limit the concentration and temperature.

First Modification

Figure 2:
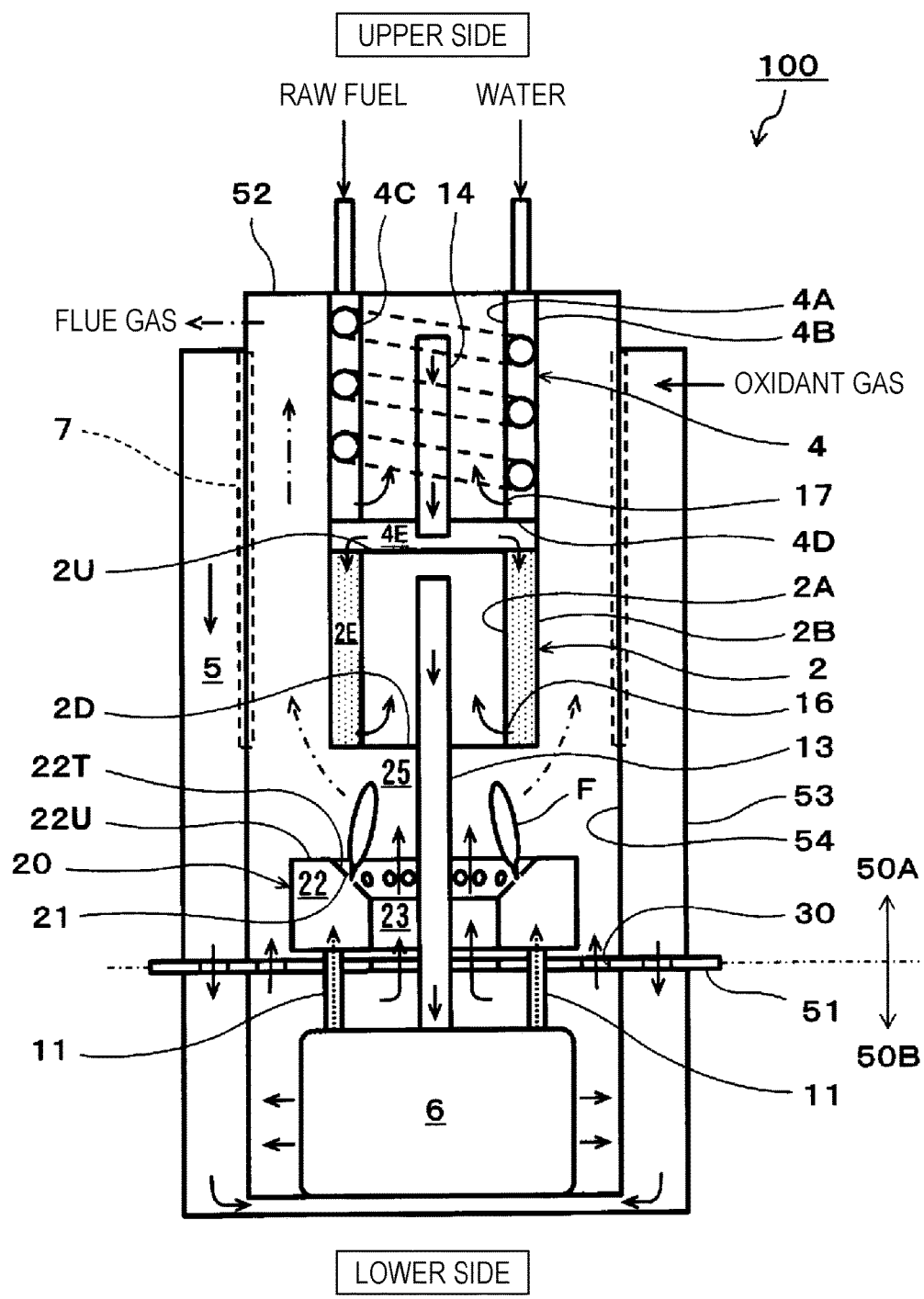
FIG. 2 illustrates a high-temperature fuel cell system according to a first modification to the embodiment.

FIG. 2 illustrates a high-temperature fuel cell system according the first modification to the embodiment.

According to the first modification illustrated in FIG. 2, the SOFC system 100 includes the reformer 2, the vaporizer 4, the oxidant-gas supply path 5, the SOFC 6, the oxidant-gas heat exchanger 7, the anode off-gas discharge paths 11, the reformed-gas supply path 13, the mixed-gas supply path 14, the burner 20, the first cathode-off-gas passing area 23, and a second cathode-off-gas passing area 30.

The reformer 2, the vaporizer 4, the oxidant-gas supply path 5, the SOFC 6, the oxidant-gas heat exchanger 7, the anode off-gas discharge paths 11, the reformed-gas supply path 13, the mixed-gas supply path 14, the burner 20, and the first cathode-off-gas passing area 23 are the same as in the SOFC system 100 according to the embodiment, and description thereof is omitted.

According to the first modification, in the SOFC system 100 according to any one of the first to fourth aspects of the present disclosure, some of the cathode off-gas ejected from the cathode of the SOFC 6 passes upward through the second cathode-off-gas passing area 30 outside the anode-off-gas gathering portion 22, and the anode off-gas ejected from the anode-off-gas ejection holes 21 and the cathode off-gas that has passed through the second cathode-off-gas passing area 30 are burned. Specifically, in the SOFC system 100 according to the first modification, the cathode-off-gas discharge path is formed of the space between the outer shell of the SOFC 6 and the inner wall 54, the space between the outer shell of the SOFC 6 and the partition wall 51, the first cathode-off-gas passing area 23, and the second cathode-off-gas passing area 30.

Specifically, openings formed in the partition wall 51 inside the inner wall 54 and outside the anode-off-gas gathering portion 22 form the second cathode-off-gas passing area 30.

In the first cathode-off-gas passing area 23, the cathode off-gas passes inside the anode-off-gas gathering portion 22, and the flames F are ignited inward from the anode-off-gas ejection holes 21 so as to approach the reformed-gas supply path 13. For this reason, it is difficult for the cathode off-gas to reach the outer circumference of the flames F in some cases.

In view of this, in the SOFC system 100 according to the first modification, some of the cathode off-gas passes through the second cathode-off-gas passing area 30 outside the anode-off-gas gathering portion 22, and the miscibility of the cathode off-gas and the anode off-gas can be improved even on the outer circumferential side of the flames F, resulting in a further improvement in the combustibility of the burner 20. For example, about half of the total amount of the cathode off-gas discharged from the cathode of the SOFC 6 may pass through the second cathode-off-gas passing area 30.

The structure of the SOFC system 100 according to the first modification may be the same as the SOFC system 100 according to the embodiment except for the above features.
Second Modification FIG. 3 and FIG. 4 each illustrate a high-temperature fuel cell system according to the second modification to the embodiment. FIG. 4 illustrates an air register 40 that is cut into a half in the vertical direction.

Figure 3:
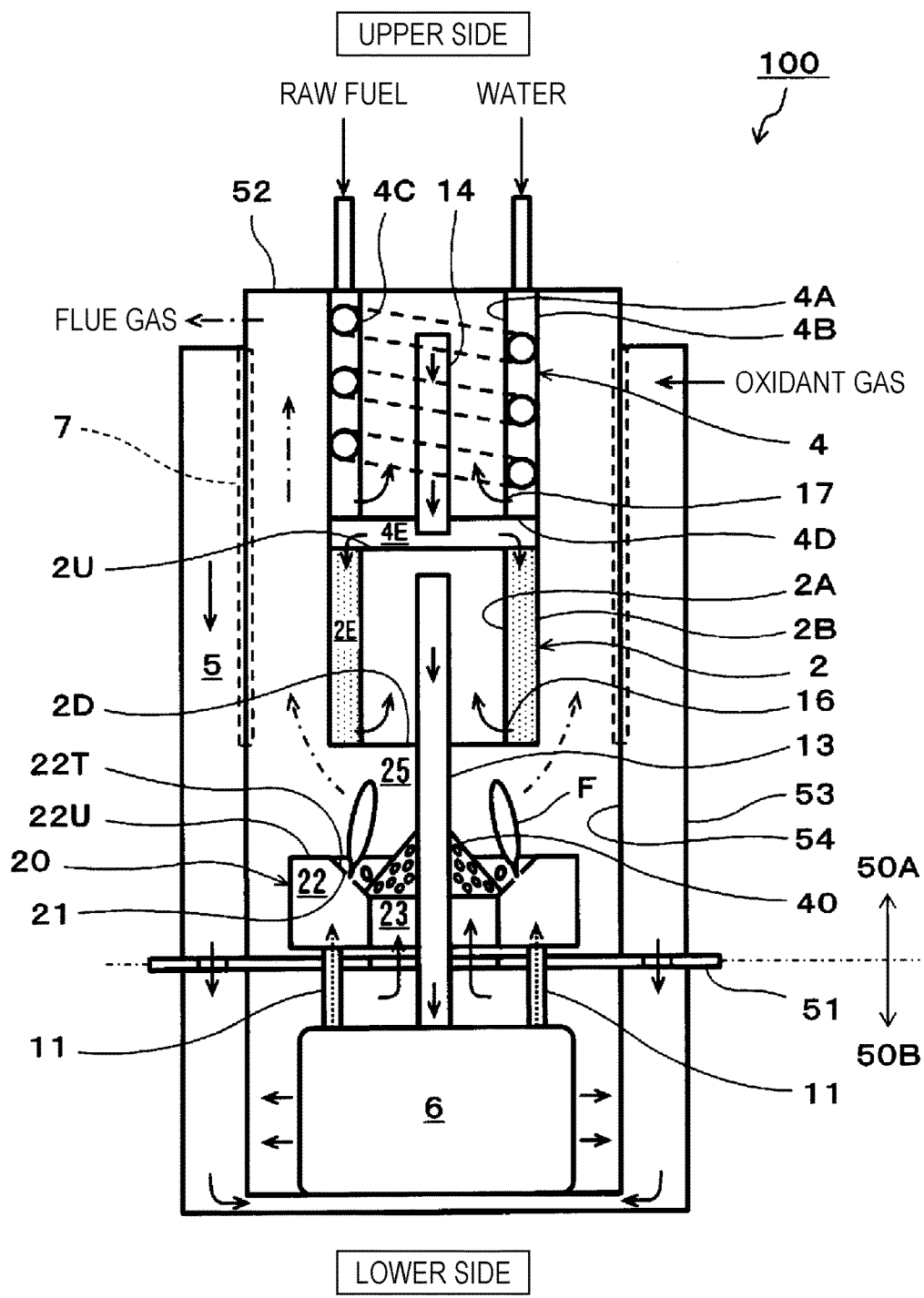
FIG. 3 illustrates a high-temperature fuel cell system according to a second modification to the embodiment.
Figure 4:
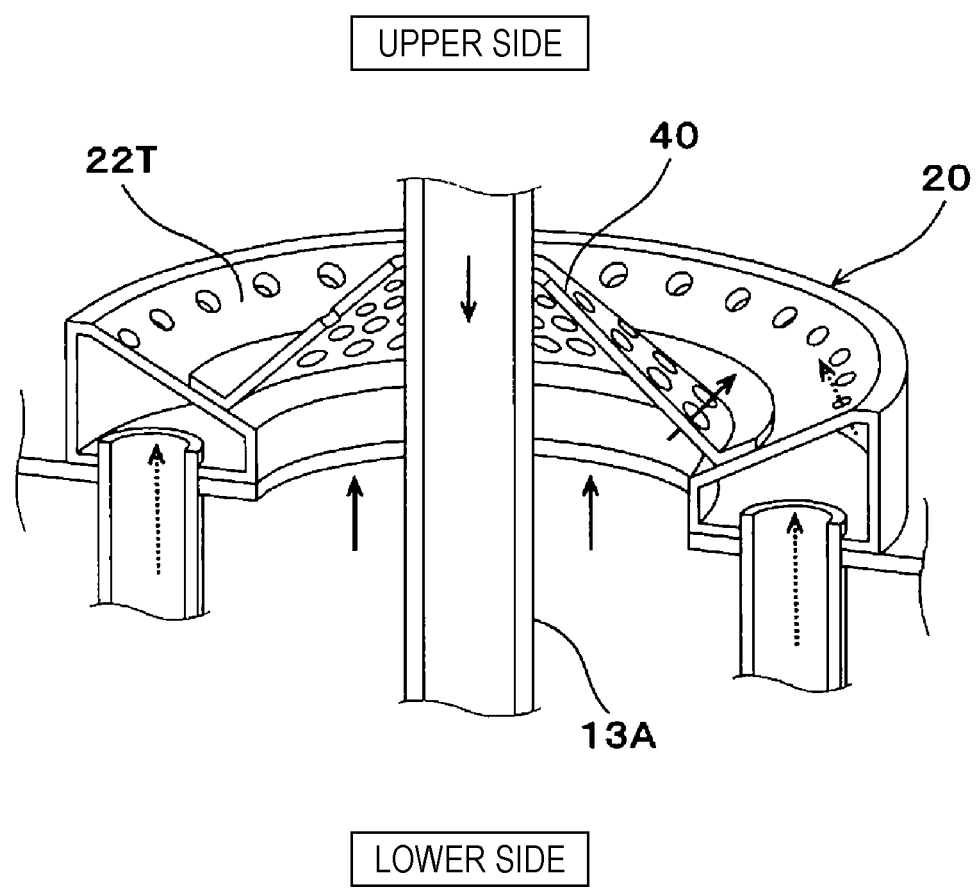
FIG. 4 illustrates the high-temperature fuel cell system according to the second modification to the embodiment.

According to the second modification illustrated in FIG. 3, the SOFC system 100 includes the reformer 2, the vaporizer 4, the oxidant-gas supply path 5, the SOFC 6, the oxidant-gas heat exchanger 7, the anode off-gas discharge paths 11, the reformed-gas supply path 13, the mixed-gas supply path 14, the burner 20, the first cathode-off-gas passing area 23, and the air register 40.

The reformer 2, the vaporizer 4, the oxidant-gas supply path 5, the SOFC 6, the oxidant-gas heat exchanger 7, the anode off-gas discharge paths 11, the reformed-gas supply path 13, the mixed-gas supply path 14, the burner 20, and the first cathode-off-gas passing area 23 are the same as in the SOFC system 100 according to the embodiment, and description thereof is omitted.

According to the second modification, the SOFC system 100 according to any one of the first to fourth aspects of the present disclosure and the first modification to the embodiment includes the air register 40 disposed therein such that the air register 40 covers the first cathode-off-gas passing area 23 from above.

As illustrated in FIG. 4, the air register 40 is formed of, for example, a conical (umbrella) air resister member having no bottom surface that is disposed between a reformed-gas supply pipe 13A forming the reformed-gas supply path 13 and the tapered surface 22T. The air resister member has holes (for example, circular holes) formed at appropriate positions in its conical surface.

Adjustments in the position and size of the holes formed in the air resister member enable optimization of, for example, the direction of the cathode off-gas (air) that is to be supplied to the combustion space 25. That is, the direction of the cathode off-gas passing upward through the first cathode-off-gas passing area 23 can be changed to a diagonally upward and outward direction. This improves the diffusibility of the cathode off-gas in the combustion space 25 more than in the case where no air register 40 is provided, and a stream of the anode off-gas and a stream of the cathode off-gas are likely to come into contact with each other. Accordingly, the miscibility of the cathode off-gas and the anode off-gas in the combustion space 25 can be further improved.

The air resister member has a function to shield the heat dissipation (radiant heat) of the flames F to the reformed-gas supply pipe 13A. For example, the heat dissipation (radiant heat) of the flames F to the reformed-gas supply pipe 13A can be appropriately shielded in a manner in which a joint between the air resister member and the reformed-gas supply pipe 13A is disposed at an appropriate position.

The structure of the SOFC system 100 according to the second modification may be the same as the SOFC system 100 according to the embodiment except for the above features.
Third Modification FIG. 5 illustrates a high-temperature fuel cell system according to the third modification to the embodiment.

Figure 5:
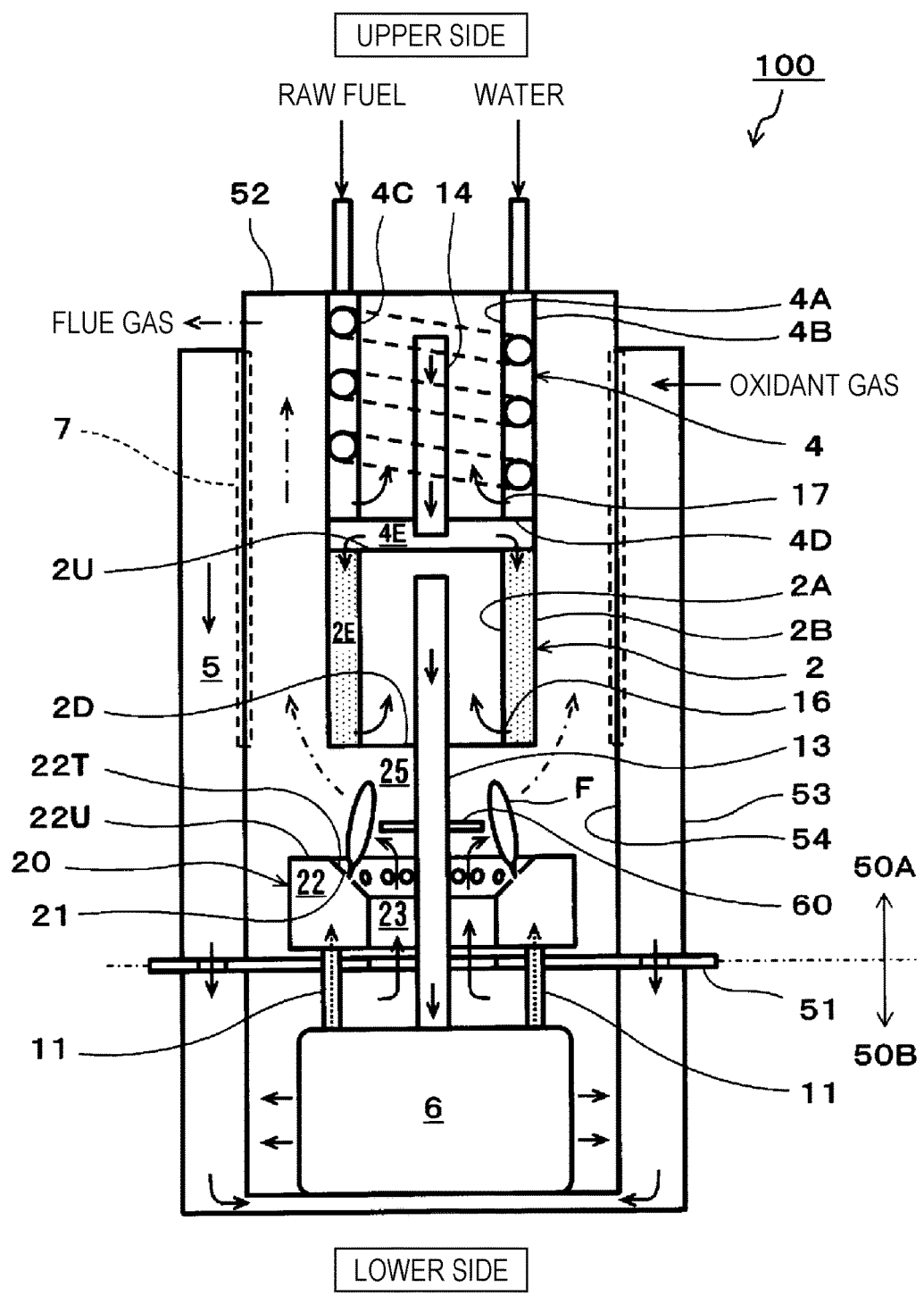
FIG. 5 illustrates a high-temperature fuel cell system according to a third modification to the embodiment.

According to the third modification illustrated in FIG. 5, the SOFC system 100 includes the reformer 2, the vaporizer 4, the oxidant-gas supply path 5, the SOFC 6, the oxidant-gas heat exchanger 7, the anode off-gas discharge paths 11, the reformed-gas supply path 13, the mixed-gas supply path 14, the burner 20, the first cathode-off-gas passing area 23, and a baffle plate 60.

The reformer 2, the vaporizer 4, the oxidant-gas supply path 5, the SOFC 6, the oxidant-gas heat exchanger 7, the anode off-gas discharge paths 11, the reformed-gas supply path 13, the mixed-gas supply path 14, the burner 20, and the first cathode-off-gas passing area 23 are the same as in the SOFC system 100 according to the embodiment, and description thereof is omitted.

According to the third modification, the SOFC system 100 according to any one of the first to fourth aspects of the present disclosure and the first modification to the embodiment includes the baffle plate 60 disposed therein such that the baffle plate 60 covers the first cathode-off-gas passing area 23 from above.

Specifically, as illustrated in FIG. 5, the baffle plate 60, which is annular, is disposed at an appropriate position around the reformed-gas supply path 13 in the combustion space 25. The baffle plate 60 can change the direction of the cathode off-gas passing upward through the first cathode-off-gas passing area 23 to an outward direction. This makes a stream of the anode off-gas and a stream of the cathode off-gas more likely to come into contact with each other than in the case where no baffle plate 60 is provided. Accordingly, the miscibility of the cathode off-gas and the anode off-gas in the combustion space 25 can be further improved.

The structure of the SOFC system 100 according to the third modification may be the same as the SOFC system 100 according to the embodiment except for the above features.

The embodiment, the first modification to the embodiment, the second modification to the embodiment, and the third modification to the embodiment can be combined with each other unless they exclude each other. For example, the SOFC system 100 according to the second modification to the embodiment corresponds to an example of the SOFC system 100 according to the embodiment including the air register 40. The SOFC system 100 according to the first modification to the embodiment may include the air register 40. The SOFC system 100 according to the third modification to the embodiment corresponds to an example of the SOFC system 100 according to the embodiment including the baffle plate 60. The SOFC system 100 according to the first modification to the embodiment may include the baffle plate 60.

Various modifications and other embodiments of the present disclosure become obvious to a person skilled in the art from the above description. Accordingly, the description should be interpreted as an example and is provided to teach the best mode for carrying out the present disclosure to a person skilled in the art. The detailed structure and/or function of the present disclosure can be substantially modified without departing from the concept of the present disclosure.

For example, according to the embodiment, the first modification to the embodiment, and the second modification to the embodiment, the SOFC system 100 includes the reformer 2 disposed above the burner 20 but is not limited thereto. For example, the reformer may be disposed inside the anode-off-gas gathering portion 22 of the burner 20.

When the SOFC system 100 is assembled, the upper area 50A and the lower area 50B may be formed of respective separate containers. Specifically, the separate containers may be finally assembled in a manner in which the oxidant-gas supply path 5, the anode off-gas discharge paths 11, and the reformed-gas supply path 13 are joined to the partition wall 51 by, for example, welding. Thus, adjustments in the joints of the oxidant-gas supply path 5, the anode off-gas discharge paths 11, and the reformed-gas supply path 13 enable the SOFC system 100 to be assembled without depending on, for example, the shape and size of the SOFC 6.

The high-temperature fuel cell system according to the aspect of the present disclosure enables the footprint of the entire system and the production cost of the system to be less than those in conventional high-temperature fuel cell systems. The high-temperature fuel cell system according to the aspect of the present disclosure can maintain burner combustibility that is better than that in conventional high-temperature fuel cell systems. Accordingly, the aspect of the present disclosure can be applied to, for example, a high-temperature fuel cell system.

What is claimed is:

1. A high-temperature fuel cell system, comprising:
a reformer that reforms a hydrocarbon-based raw fuel to generate a reformed gas containing hydrogen;
a fuel cell that generates power by using the reformed gas and an oxidant gas; and
a burner that heats the reformer,
wherein the burner includes an anode-off-gas gathering portion that has an anode-off-gas ejection hole and at which an anode off-gas discharged from an anode of the fuel cell gathers,
wherein the anode-off-gas gathering portion is formed so as to surround a first cathode-off-gas passing area through which a cathode off-gas discharged from a cathode of the fuel cell passes,
wherein the anode-off-gas ejection hole is formed such that the anode off-gas ejected upward from the anode-off-gas ejection hole approaches the cathode off-gas passing upward through the first cathode-off-gas passing area,
wherein the anode off-gas ejected from the anode-off-gas ejection hole and the cathode off-gas that has passed through the first cathode-off-gas passing area are burned, and
wherein the anode-off-gas gathering portion has a tapered surface sloping downward toward the first cathode-off-gas passing area, and the anode-off-gas ejection hole extends from the tapered surface.

2. The high-temperature fuel cell system according to claim 1, wherein the anode-off-gas gathering portion is formed of an annular body having a hollow structure, and the first cathode-off-gas passing area is formed of a space in the annular body.

3. The high-temperature fuel cell system according to claim 1, further comprising:
a reformed-gas supply path along which the reformed gas flows,
wherein the reformer is disposed above the burner, and
wherein the reformed-gas supply path extends from the reformer to the fuel cell through the first cathode-off-gas passing area.

4. The high-temperature fuel cell system according to claim 1, wherein some of the cathode off-gas passes upward through a second cathode-off-gas passing area outside the anode-off-gas gathering portion, and the anode off-gas ejected from the anode-off-gas ejection hole and the cathode off-gas that has passed through the second cathode-off-gas passing area are burned.

5. The high-temperature fuel cell system according to claim 1, further comprising:
an air register or a baffle plate that is disposed so as to cover the first cathode-off-gas passing area from above.

6. A high-temperature fuel cell system, comprising:
a reformer that reforms a hydrocarbon-based raw fuel to generate a reformed gas containing hydrogen;
a fuel cell that generates power by using the reformed gas and an oxidant gas; and
a burner that heats the reformer,
wherein the burner includes an anode-off-gas gathering portion that has an anode-off-gas ejection hole and at which an anode off-gas discharged from an anode of the fuel cell gathers,
wherein the anode-off-gas gathering portion is formed so as to surround a first cathode-off-gas passing area through which a cathode off-gas discharged from a cathode of the fuel cell passes,
wherein the anode-off-gas ejection hole is formed such that the anode off-gas ejected upward from the anode-off-gas ejection hole approaches the cathode off-gas passing upward through the first cathode-off-gas passing area,
wherein the anode off-gas ejected from the anode-off-gas ejection hole and the cathode off-gas that has passed through the first cathode-off-gas passing area are burned, and
wherein the anode-off-gas gathering portion is formed of an annular body having a hollow structure, and the first cathode-off-gas passing area is formed of a space in the annular body.

7. The high-temperature fuel cell system according to claim 6, further comprising:
a reformed-gas supply path along which the reformed gas flows, wherein the reformer is disposed above the burner, and wherein the reformed-gas supply path extends from the reformer to the fuel cell through the first cathode-off-gas passing area.

8. The high-temperature fuel cell system according to claim 6, wherein some of the cathode off-gas passes upward through a second cathode-off-gas passing area outside the anode-off-gas gathering portion, and the anode off-gas ejected from the anode-off-gas ejection hole and the cathode off-gas that has passed through the second cathode-off-gas passing area are burned.

9. The high-temperature fuel cell system according to claim 6, further comprising:

an air register or a baffle plate that is disposed so as to cover the first cathode-off-gas passing area from above.

* * * * *